(12) United States Patent
Yoshimura et al.

(10) Patent No.: US 7,101,641 B2
(45) Date of Patent: Sep. 5, 2006

(54) LITHIUM PRIMARY BATTERY

(75) Inventors: Seiji Yoshimura, Kobe (JP); Hiroshi Nakajima, Hirakata (JP); Maruo Kamino, Itano-gun (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 407 days.

(21) Appl. No.: 10/087,508

(22) Filed: Mar. 1, 2002

(65) Prior Publication Data
US 2002/0172864 A1 Nov. 21, 2002

(30) Foreign Application Priority Data

Mar. 6, 2001 (JP) ............................... 2001-61804
Feb. 15, 2002 (JP) ............................... 2002-38511

(51) Int. Cl.
H01M 4/50 (2006.01)
H01M 4/58 (2006.01)

(52) U.S. Cl. ..................................... 429/224; 429/218.1
(58) Field of Classification Search ........... 429/231.95, 429/231.6
See application file for complete search history.

(56) References Cited

U.S. PATENT DOCUMENTS 5,114,811 A * 5/1992 Ebel et al. .................. 429/337
5,578,395 A * 11/1996 Yoshimura et al. ......... 429/331

FOREIGN PATENT DOCUMENTS

| JP | 05166509 | 7/1993 |
| JP | 9-270259 | * 10/1997 |
| JP | 11339794 | 12/1999 |
| JP | 2001-52698 | * 2/2001 |

OTHER PUBLICATIONS

C. A. Frysz et al.; "Carbon Filaments and Carbon Black as a Conductive Additive*", Journal of Power Sources 58 (1996), pp. 41 to 54. *To the Manganese Dioxide Cathode of a Lithium Electrolytic Cell.

J. Drews et al.; "High-Rate Lithium/Manganese Dioxide Batteries; The Double Cell Concept", Journal of Power Sources 65, (1997), pp. 129 to 132.

* cited by examiner

Primary Examiner—Patrick Joseph Ryan
Assistant Examiner—Julian Mercado
(74) Attorney, Agent, or Firm—W. F. Fasse; W. G. Fasse

(57) ABSTRACT

In a lithium battery comprising a positive electrode for which manganese dioxide is employed, manganese dioxide containing 0.1 to 3% by weight of boron is employed as the positive electrode and a lithium alloy containing 0.05 to 2% by weight of aluminum is employed as the negative electrode.

6 Claims, 1 Drawing Sheet

LITHIUM PRIMARY BATTERY

BACKGROUND OF THE INVENTION

1. Field of the Invention

The present invention relates to a lithium battery, especially a lithium battery using manganese dioxide for the positive electrode.

2. Related Art

A lithium battery has a remarkably high electromotive force and excellent characteristics, and thus has been used in various applications for which such characteristics are utilized. Especially, a lithium battery using manganese dioxide for the positive electrode is excellent in high-rate discharge characteristics and low-temperature discharge characteristics and has been used for various applications such as a camera, a memory back up and the like. However, along with the expansion of the uses, higher storage life characteristics are required especially for the use for meters or the like.

In conventional lithium batteries using manganese dioxide for the positive electrode, pure manganese dioxide or manganese dioxide containing boron is used for the positive electrode (Japanese Patent Laid Open No. Hei 11-339794 (1999)). However, in such conventional lithium, batteries, manganese dioxide is dissolved in an electrolyte solution and is deposited on the negative electrode during storage, so that the storage life characteristics could not be sufficient.

SUMMARY OF THE INVENTION

An object of the present invention is to provide a lithium primary battery using manganese dioxide for the positive electrode and being excellent in storage life characteristics.

The present invention provides a lithium primary battery comprising a positive electrode, a negative electrode, and a non-aqueous electrolyte, wherein manganese dioxide containing 0.1 to 3% by weight of boron is used as the positive electrode and a lithium alloy containing 0.05 to 2% by weight of aluminum is used as the negative electrode.

In the present invention, since boron is added in 0.1 to 3% by weight to manganese dioxide, the dissolution of manganese dioxide to the electrolyte solution can be suppressed. That is supposed to be attributed to a coating of manganese-boron composite oxide formed on the surface of manganese dioxide particles.

Further, in the present invention, the lithium alloy containing 0.05 to 2% by weight of aluminum is used as the negative electrode. Such a lithium alloy suppresses the deposition of manganese dioxide, dissolved from the positive electrode, on the negative electrode. That is supposed to be attributed to a coating of lithium-aluminum-boron alloy formed on the negative electrode.

In the present invention, the above-described functions of the positive electrode and the negative electrode are supposed to work cooperatively to result in remarkable improvement in the storage life characteristics.

In the present invention, addition of boron to manganese dioxide is preferably performed by adding a boron-containing compound to manganese dioxide. The boron-containing compound is exemplified by boric acid ($H_3BO_3$), boron oxide ($B_2O_3$), metaboric acid ($HBO_2$), hypoboric acid ($H_4B_2O_4$), and lithium salts of boric acid compounds, such as lithium borate ($Li_3BO_3$), lithium metaborate ($LiBO_2$), lithium hypoborate ($Li_4B_2O_4$), and the like.

In the present invention, after addition of such a boron-containing compound to manganese dioxide, heat treatment is preferably carried out at a temperature ranging from 350 to 430° C.

Furthermore, in the present invention, it is preferable that 0.02 to 2% by weight of phosphorus is further added to manganese dioxide. That is, it is preferable to use manganese dioxide containing 0.1 to 3% by weight of boron and 0.02 to 2% by weight of phosphorus. Addition of phosphorus further improves the storage life characteristics of the battery. It is supposed that a coating of manganese-boron-phosphorus composite oxide formed on the surface of manganese dioxide particles strongly suppresses the dissolution of manganese dioxide.

In the present invention, the lithium alloy containing 0.05 to 2% by weight of aluminum is used. The lithium alloy containing aluminum can be produced by, for example, adding a prescribed amount of aluminum to melted lithium metal.

As a solvent to be employed for the non-aqueous electrolyte of the lithium battery of the present invention, any solvent employed for a lithium battery can be used without particular restrictions. Examples of such a solvent are cyclic carbonates such as ethylene carbonate, propylene carbonate, butylene carbonate, vinylene carbonate and the like, and chain carbonates such as dimethyl carbonate, diethyl carbonate, methyl ethyl carbonate and the like. It is preferable to use a mixed solvent of the cyclic carbonate and the chain carbonate, as well as a mixed solvent of the above-listed cyclic carbonate and an ether solvent such as 1,2-dimethoxyethane or 1,2-diethoxyethane or a chain ester such as γ-butyrolactone, sulfolane or methyl acetate.

As the solute of the non-aqueous electrolyte, any solute employed for a lithium battery can be used without any particular restrictions. Examples of such a solute are $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $Li_2B_{10}Cl_{10}$, $Li_2B_{12}Cl_{12}$, and the like.

DESCRIPTION OF PREFERRED EXAMPLES

Figure 1:
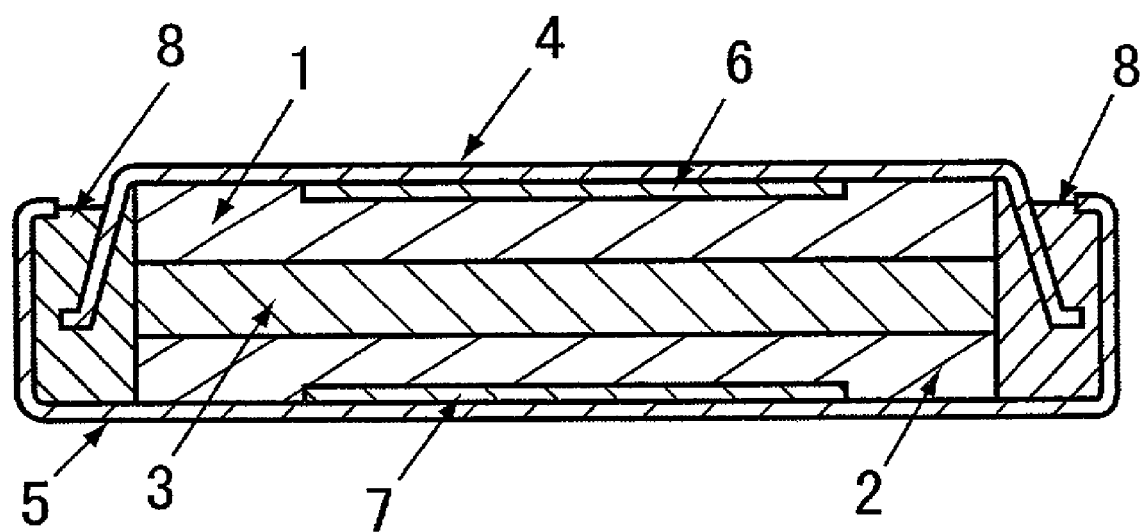
FIG. 1 is a schematic cross-sectional view of a lithium battery produced in an example according to the present invention.

Hereinafter, the present invention will be described more particularly with the reference to the examples, however, the present invention is not at all restricted to the following examples and will cover any modifications or embodiments as fall within the scope of the present invention.

Example 1

Example 1-1

[Fabrication of Positive Electrode]

A powder of boric acid ($H_3BO_3$) was added to a powder of manganese dioxide to adjust the content of boron to be 0.5% by weight and then the resulting mixture was heat treated (fired) at 375° C. for 20 hours in air and pulverized to obtain a boric acid-containing manganese dioxide as a positive active material.

The obtained boric acid-containing manganese dioxide (powder), carbon black (powder) as a conductive material, and fluoro resin (powder) as a binder were mixed in a ratio of 85:10:5 by weight to obtain a positive electrode mix. The positive electrode mix was die-cast into a disk-like shape and dried at 250° C. for 2 hours in vacuum to produce a positive electrode.

[Fabrication of Negative Electrode]

A lithium (Li—Al) alloy containing 0.5% by weight of aluminum was punched into a disk-like shape to produce a negative electrode.

[Preparation of Non-Aqueous Electrolyte Solution]

Lithium trifluoromethanesulfonate ($LiCF_3SO_3$) as a solute was dissolved in 1 mol/L in a solvent mixture of ethylene carbonate (PC) and 1,2-dimethoxyethane (DME) in a ratio of 50:50 by volume to obtain a non-aqueous electrolyte solution.

[Production of Lithium Battery]

Using the above-described positive electrode, negative electrode, and non-aqueous electrolyte solution, a coin type lithium battery (the battery's size: the outer diameter 24 mm, the thickness 3 mm) was assembled. A porous membrane made of polypropylene was used as a separator and the membrane was impregnated with the non-aqueous electrolyte solution.

FIG. 1 is a schematic cross-sectional view showing the produced lithium battery. The lithium battery was composed of the negative electrode 1, the positive electrode 2, the separator 3 for isolating these electrodes 1 and 2 from each other, a negative electrode case 4, a positive electrode case 5, a negative electrode current collector 6, a positive electrode current collector 7, and an insulating packing 8 made of polypropylene. The negative electrode current collector 6 was made of a stainless steel sheet (SUS 304) and the positive electrode current collector 7 was made of a stainless steel sheet (SUS 316).

As shown in FIG. 1, the negative electrode 1 and the positive electrode 2 were on the opposite to each other through the separator 3 impregnated with the non-aqueous electrolyte solution and housed in the inside of the battery case composed of the negative electrode case 4 and the positive electrode case 5. The positive electrode 2 was connected to the positive electrode case 5 through the positive electrode current collector 7 and the negative electrode 1 was connected to the negative electrode case 4 through the negative electrode current collector 6, so that the chemical energy generated in the inside of the battery can be led out to the outside as electric energy through both terminals of the positive electrode case 5 and the negative electrode case 4.

The discharge capacity of the produced lithium battery was 100 mAh and the internal resistance of the battery before storage was about 15 Ω. Also, as for each battery of the following examples and comparative examples, the discharge capacity was 100 mAh and the internal resistance was about 15 Ω.

Example 1-2

An inventive battery A2 was assembled in the same manner as the Example 1-1 except that manganese dioxide to which boron oxide ($B_2O_3$) was added so as to adjust the content of boron to be 0.5% by weight was used.

Example 1-3

An inventive battery A3 was assembled in the same manner as the Example 1-1 except that manganese dioxide to which metaboric acid ($HBO_2$) was added so as to adjust the content of boron to be 0.5% by weight was used.

Example 1-4

An inventive battery A4 was assembled in the same manner as the Example 1-1 except that manganese dioxide to which hypoboric acid ($H_4B_2O_4$) was so added as to adjust the content of boron to be 0.5% by weight was used.

Example 1-5

An inventive battery A5 was assembled in the same manner as the Example 1-1 except that manganese dioxide to which lithium metaborate ($LiBO_2$) was added so as to adjust the content of boron to be 0.5% by weight was used.

Comparative Example 1-1

A comparative battery X1 was assembled in the same manner as the Example 1-1 except that manganese dioxide containing no boron was used and lithium metal containing no aluminum was used.

Comparative Example 1-2

A comparative battery X2 was assembled in the same manner as the Example 1-1 except that manganese dioxide containing no boron was used.

Comparative Example 1-3

A comparative battery X3 was assembled in the same manner as the Example 1-1 except that lithium metal containing no aluminum was used.

[Evaluation of Storage Life Characteristics]

Each battery of the Examples and the Comparative Examples produced in the above-described manner, immediately after the battery production, was discharged to 2V at an electric current value of 10 mA at 25° C. to measure the discharge capacity before storage. Further, each battery after stored for 3 months at 70° C. was discharged to 2V at an electric current value of 10 mA at 25° C. to measure the discharge capacity after storage. Based on the following formula, the self-discharge rate of each battery was calculated:

self-discharge rate (%)=[(discharge capacity before storage−discharge capacity after storage)/(discharge capacity before storage)]×100

The measurement results are shown in Table 1.

TABLE 1

| Battery | B (wt. %) | Al (wt. %) | Self-Discharge Rate (%) |
| --- | --- | --- | --- |
| A1 | 0.5 ($H_3BO_3$) | 0.5 | 1.2 |
| A2 | 0.5 ($B_2O_3$) | 0.5 | 1.3 |
| A3 | 0.5 ($HBO_2$) | 0.5 | 1.4 |
| A4 | 0.5 ($H_2B_2O_4$) | 0.5 | 1.4 |
| A5 | 0.5 ($LiBO_2$) | 0.5 | 1.8 |
| X1 | 0 | 0 | 3.2 |
| X2 | 0 | 0.5 | 3.1 |
| X3 | 0.5 ($H_3BO_3$) | 0 | 2.5 |

As apparent from Table 1, in the case of the comparative batteries X1 to X3 in which manganese dioxide containing no boron or lithium metal containing no aluminum was employed, the self-discharge rate was 2.5% or higher, whereas in the case of the inventive batteries A1 to A5 in which manganese dioxide containing boron and the lithium alloy containing aluminum were employed, the self-discharge rate was 2% or lower to make it clear that the storage life characteristics were improved.

It is supposed that a coating of a manganese-boron composite oxide was formed on the surface of manganese dioxide particles to suppress the dissolution of manganese dioxide in the non-aqueous electrolyte solution and also that a lithium-aluminum-boron alloy was produced on the negative electrode to suppress the deposition of manganese dioxide dissolved from the positive electrode, on the negative electrode. It is also supposed that such reactions on the positive electrode and the negative electrode work cooperatively to result in remarkable improvement of the storage life characteristics of the inventive batteries.

Example 2

Example 2-1

An inventive battery B1 was assembled in the same manner as the Example 1-1 except that manganese dioxide to which boric acid ($H_3BO_3$) was so added as to adjust the content of boron to be 0.1% by weight was used.

Example 2-2

An inventive battery B2 was assembled in the same manner as the Example 1-1 except that manganese dioxide to which boric acid ($H_3BO_3$) was added so as to adjust the content of boron to be 0.5% by weight was used.

Example 2-3

An inventive battery B3 was assembled in the same manner as the Example 1-1 except that manganese dioxide to which boric acid ($H_3BO_3$) was added so as to adjust the content of boron to be 1% by weight was used.

Example 2-4

An inventive battery B4 was assembled in the same manner as the Example 1-1 except that manganese dioxide to which boric acid ($H_3BO_3$) was added so as to adjust the content of boron to be 2% by weight was used.

Example 2-5

An inventive battery B5 was assembled in the same manner as the Example 1-1 except that manganese dioxide to which boric acid ($H3BO_3$) was so added as to adjust the content of boron to be 3% by weight was used.

Comparative Example 2-1

A comparative battery Y1 was assembled in the same manner as the Example 1-1 except that manganese dioxide containing no boron was used.

Comparative Example 2-2

A comparative battery Y2 was assembled in the same manner as the Example 1-1 except that manganese dioxide to which boric acid ($H_3BO_3$) was so added as to adjust the content of boron to be 5% by weight was used.

[Evaluation of Storage Life Characteristics]

Regarding the respective batteries produced in the above-described manner, the self-discharge rates were measured in the same manner as the Example 1 and the measurement results are shown in Table 2. The inventive battery B2 is the same battery as the inventive battery A1 and the comparative battery Y1 is the same battery as the comparative battery X2.

TABLE 2

| Battery | B (wt. %) | Al (wt. %) | Self-Discharge Rate (%) |
|---|---|---|---|
| Y1 (X2) | 0 | 0.5 | 3.1 |
| B1 | 0.1 ($H_3BO_3$) | 0.5 | 2.0 |
| B2 (A1) | 0.5 ($H_3BO_3$) | 0.5 | 1.2 |
| B3 | 1 ($H_3BO_3$) | 0.5 | 1.4 |
| B4 | 2 ($H_3BO_3$) | 0.5 | 1.6 |
| B5 | 3 ($H_3BO_3$) | 0.5 | 2.0 |
| Y2 | 5 ($H_3BO_3$) | 0.5 | 2.5 |

As apprent from the results shown in Table 2, in the case of the inventive batteries B1 to B5 in which manganese dioxide containing 0.1 to 3% by weight of boron and the lithium alloy containing aluminum were employed, the self-discharge rate was 2% or lower, showing excellent storage life characteristics.

It is supposed that a sufficient amount of a manganese-boron composite oxide could not be formed on the surface of manganese dioxide particles if the addition amount of boron was less than 0.1% by weight and therefore the dissolution of manganese dioxide in the non-aqueous electrolyte solution could not be sufficiently suppressed. On the other hand, if the addition amount of boron was more than 3% by weight, it is supposed that a manganese-boron composite oxide which contained too much boron and could not suppress dissolution of manganese dioxide was produced on the surface of the manganese dioxide particles.

Example 3

Example 3-1

An inventive battery C1 was assembled in the same manner as the Example 1-1 except that a lithium alloy containing 0.05% by weight of aluminum was used.

Example 3-2

An inventive battery C2 was assembled in the same manner as the Example 1-1 except that a lithium alloy containing 0.1% by weight of aluminum was used.

Example 3-3

An inventive battery C3 was assembled in the same manner as the Example 1-1 except that a lithium alloy containing 0.5% by weight of aluminum was used.

Example 3-4

An inventive battery C4 was assembled in the same manner as the Example 1-1 except that a lithium alloy containing 1% by weight of aluminum was used.

Example 3-5

An inventive battery C5 was assembled in the same manner as the Example 1-1 except that a lithium alloy containing 2% by weight of aluminum was used.

Comparative Example 3-1

A comparative battery Z1 was assembled in the same manner as the Example 1-1 except that lithium metal containing no aluminum was used.

Comparative Example 3-2

A comparative battery Z2 was assembled in the same manner as the Example 1-1 except that a lithium alloy containing 3% by weight of aluminum was used.

[Evaluation of Storage Life Characteristics]

Regarding the respective batteries produced in the above-described manner, the self-discharge rates were measured in the same manner as the Example 1 and the measurement results are shown in Table 3. The inventive battery C3 is the same battery as the inventive battery A1 and the comparative battery Z1 is the same battery as the comparative battery X3.

TABLE 3

| Battery | B (wt. %) | Al (wt. %) | Self-Discharge Rate (%) |
|---|---|---|---|
| Z1 (X3) | 0.5 ($H_3BO_3$) | 0 | 2.5 |
| C1 | 0.5 ($H_3BO_3$) | 0.05 | 2.0 |
| C2 | 0.5 ($H_3BO_3$) | 0.1 | 1.4 |
| C3 (A1) | 0.5 ($H_3BO_3$) | 0.5 | 1.2 |
| C4 | 0.5 ($H_3BO_3$) | 1 | 1.5 |
| C5 | 0.5 ($H_3BO_3$) | 2 | 2.0 |
| Z2 | 0.5 ($H_3BO_3$) | 3 | 2.5 |

As apprent from Table 3, in the case of the inventive batteries C1 to C5 in which manganese dioxide containing boron was used as the positive electrodes and the lithium alloy containing 0.05 to 2% by weight of aluminum was used as the negative electrodes, the self-discharge rate was 2% or lower, showing excellent storage life characteristics.

It is supposed that a sufficient amount of a lithium-aluminum-boron alloy could not be produced on the surface of the negative electrodes if the aluminum amount was less than 0.05% by weight and therefore the deposition manganese dioxide dissolved from the positive electrodes could not be suppressed. On the other hand, if the aluminum amount was more than 2% by weight, it is supposed that a lithium-aluminum-boron alloy containing too much aluminum to improve the storage life characteristics was produced on the negative electrodes.

Example 4

Example 4-1

An inventive battery D1 was assembled in the same manner as the Example 1-1 except that manganese dioxide to which boric acid ($H_3BO_3$) was so added as to adjust the content of boron to be 0.5% by weight was used without being subjected to the heat treatment.

Example 4-2

An inventive battery D2 was assembled in the same manner as the Example 1-1 except that manganese dioxide to which boric acid ($H_3BO_3$) was added so as to adjust the content of boron to be 0.5% by weight was heat treated (fired) at 300° C. for 20 hours in air.

Example 4-3

An inventive battery D3 was assembled in the same manner as the Example 1-1 except that manganese dioxide to which boric acid ($H_3BO_3$) was so added as to adjust the content of boron to be 0.5% by weight was heat treated (fired) at 350° C. for 20 hours in air.

Example 4-4

An inventive battery D4 was assembled in the same manner as the Example 1-1 except that manganese dioxide to which boric acid ($H_3BO_3$) was added so as to adjust the content of boron to be 0.5% by weight was heat treated (fired) at 375° C. for 20 hours in air.

Example 4-5

An inventive battery D5 was assembled in the same manner as the Example 1-1 except that manganese dioxide to which boric acid ($H_3BO_3$) was added so as to adjust the content of boron to be 0.5% by weight was heat treated (fired) at 400° C. for 20 hours in air.

Example 4-6

An inventive battery D6 was assembled in the same manner as the Example 1-1 except that manganese dioxide to which boric acid ($H_3BO_3$) was added so as to adjust the content of boron to be 0.5% by weight was heat treated (fired) at 430° C. for 20 hours in air.

Example 4-7

An inventive battery D7 was assembled in the same manner as the Example 1-1 except that manganese dioxide to which boric acid ($H_3BO_3$) was so added as to adjust the content of boron to be 0.5% by weight was heat treated (fired) at 450° C. for 20 hours in air.

[Evaluation of Storage Life Characteristics]

Regarding the respective batteries produced in the above-described manner, the self-discharge rates were measured in the same manner as the Example 1 and the measurement results are shown in Table 4. The inventive battery D4 is the same battery as the inventive battery A1.

TABLE 4

| Battery | B (wt. %) | Al (wt. %) | Heat Treatment Temperature (° C.) | Self-Discharge Rate (%) |
|---|---|---|---|---|
| D1 | 0.5 ($H_3BO_3$) | 0.5 | Without Heat Treatment | 1.8 |
| D2 | 0.5 ($H_3BO_3$) | 0.5 | 300 | 1.5 |
| D3 | 0.5 ($H_3BO_3$) | 0.5 | 350 | 1.3 |
| D3 (A1) | 0.5 ($H_3BO_3$) | 0.5 | 375 | 1.2 |
| D5 | 0.5 ($H_3BO_3$) | 0.5 | 400 | 1.3 |
| D6 | 0.5 ($H_3BO_3$) | 0.5 | 430 | 1.3 |
| D7 | 0.5 ($H_3BO_3$) | 0.5 | 450 | 1.5 |

As apparent from Table 4, in the case of the inventive batteries D3 to D6 in which the heat treatment temperature of the manganese dioxide containing boron was controlled to be in a range from 350 to 430° C., especially excellent storage life characteristics were obtained.

Example 5

Example 5-1

An inventive battery E1 was assembled in the same manner as the Example 1-1. That is, manganese dioxide to which boric acid ($H_3BO_3$) was added so as to adjust the content of boron to be 0.5% by weight was heat treated (fired) at 375° C. for 20 hours in air and pulverized to use the resulting boron-containing manganese dioxide as a positive electrode active material.

Example 5-2

An inventive battery E2 was assembled in the same manner as the Example 1-1 except that manganese dioxide to which boric acid ($H_3BO_3$) was so added as to adjust the content of boron to be 0.5% by weight and lithium phosphate ($Li_3PO_4$) was so added as to adjust the content of phosphorus to be 0.02% by weight was heat treated (fired) at 375° C. for 20 hours in air and pulverized to use the resulting manganese dioxide containing boron and phosphorus as a positive electrode active material.

Example 5-3

An inventive battery E3 was assembled in the same manner as the Example 1-1 except that manganese dioxide to which boric acid ($H_3BO_3$) was so added as to adjust the content of boron to be 0.5% by weight and lithium phosphate ($Li_3PO_4$) was so added as to adjust the content of phosphorus to be 0.05% by weight was heat treated (fired) at 375° C. for 20 hours in air and pulverized to use the resulting manganese dioxide containing boron and phosphorus as a positive electrode active material.

Example 5-4

An inventive battery E4 was assembled in the same manner as the Example 1-1 except that manganese dioxide to which boric acid ($H_3BO_3$) was so added as to adjust the content of boron to be 0.5% by weight and lithium phosphate ($Li_3PO_4$) was so added as to adjust the content of phosphorus to be 0.1% by weight was heat treated (fired) at 375° C. for 20 hours in air and pulverized to use the resulting manganese dioxide containing boron and phosphorus as a positive electrode active material.

Example 5-5

An inventive battery E5 was assembled in the same manner as the Example 1-1 except that manganese dioxide to which boric acid ($H_3BO_3$) was added so as to adjust the content of boron to be 0.5% by weight and lithium phosphate ($Li_3PO_4$) was added so as to adjust the content of phosphorus to be 0.5% by weight was heat treated (fired) at 375° C. for 20 hours in air and pulverized to use the resulting manganese dioxide containing boron and phosphorus as a positive electrode active material.

Example 5-6

An inventive battery E6 was assembled in the same manner as the Example 1-1 except that manganese dioxide to which boric acid ($H_3BO_3$) was added so as to adjust the content of boron to be 0.5% by weight and lithium phosphate ($Li_3PO_4$) was added so as to adjust the content of phosphorus to be 1% by weight was heat treated (fired) at 375° C. for 20 hours in air and pulverized to use the resulting manganese dioxide containing boron and phosphorus as a positive electrode active material.

Example 5-7

An inventive battery E7 was assembled in the same manner as the Example 1-1 except that manganese dioxide to which boric acid ($H_3BO_3$) was so added as to adjust the content of boron to be 0.5% by weight and lithium phosphate ($Li_3PO_4$) was so added as to adjust the content of phosphorus to be 2% by weight was heat treated (fired) at 375° C. for 20 hours in air and pulverized to use the resulting manganese dioxide containing boron and phosphorus as a positive electrode active material.

Comparative Example-5-1

A comparative battery V1 was assembled in the same manner as the Example 5-4 except that lithium metal containing no aluminum was used.

[Evaluation of Storage Life Characteristics]

Regarding the respective batteries produced in the above-described manner, the self-discharge rates were measured in the same manner as the Example 1 and the measurement results are shown in Table 5. The inventive battery E1 is the same battery as the inventive battery A1.

TABLE 5

| Battery | B (wt. %) | P (wt. %) | Al (wt. %) | Self-Discharge Rate (%) |
|---|---|---|---|---|
| E1 (A1) | 0.5 ($H_3BO_3$) | 0 | 0.5 | 1.2 |
| E2 | 0.5 ($H_3BO_3$) | 0.02 | 0.5 | 1.1 |
| E3 | 0.5 ($H_3BO_3$) | 0.05 | 0.5 | 1.1 |
| E4 | 0.5 ($H_3BO_3$) | 0.1 | 0.5 | 1.0 |
| E5 | 0.5 ($H_3BO_3$) | 0.5 | 0.5 | 0.9 |
| E6 | 0.5 ($H_3BO_3$) | 1 | 0.5 | 1.1 |
| E7 | 0.5 ($H_3BO_3$) | 2 | 0.5 | 1.2 |
| V1 | 0.5 ($H_3BO_3$) | 0.1 | 0 | 2.5 |

As apparent from Table 5, the self-discharge rate of the batteries E2 to E7 comprising positive electrodes in which manganese dioxide containing boron and phosphorus was used was further lower than the self-discharge rate of the inventive battery E1 comprising the positive electrode for which manganese dioxide containing only boron to make it clear that the storage life characteristics were further improved. It is supposed that manganese-boron-phosphorus composite oxide was formed on the surface of manganese dioxide particles and the manganese-boron-phosphorus composite oxide is supposed to more strongly suppress dissolution of manganese dioxide than manganese-boron composite oxide.

In the above-described Examples, lithium phosphate was used as the phosphorus-containing compound to add phosphorus to manganese dioxide, however, the phosphorus-containing compound for adding phosphorus may be phosphorus pentoxide and various lithium salts of other phosphoric acids.

According to the present invention, in the lithium battery using manganese dioxide for the positive electrode, storage life characteristics can be improved.

What is claimed is:

1. A lithium primary battery comprising a positive electrode, a negative electrode, and a non-aqueous electrolyte, wherein manganese dioxide containing 0.1 to 3% by weight of boron is used as said positive electrode, a lithium alloy containing 0.05 to 2% by weight of aluminum is used as said negative electrode, and said positive electrode consists essentially of said manganese dioxide, said boron, and carbon.

2. The lithium primary battery according to claim 1, wherein said boron is added to manganese dioxide by adding boric acid.

3. The lithium primary battery according to claim 1, wherein the positive electrode is produced by heat treatment of manganese dioxide after addition of boron at a temperature ranging from 350 to 430° C.

4. The lithium primary battery according to claim 1, wherein said positive electrode does not contain lithium.

5. The lithium primary battery according to claim 1, wherein said manganese dioxide does not contain lithium.

6. A lithium primary battery comprising:
a positive electrode consisting essentially of manganese dioxide, carbon, and 0.1 to 3 weight percent of boron;
a negative electrode comprising a lithium alloy containing lithium and 0.05 to 2 weight percent of aluminum; and
a non-aqueous electrolyte.

* * * * *